United States Patent Office 3,615,078
Patented Oct. 26, 1971

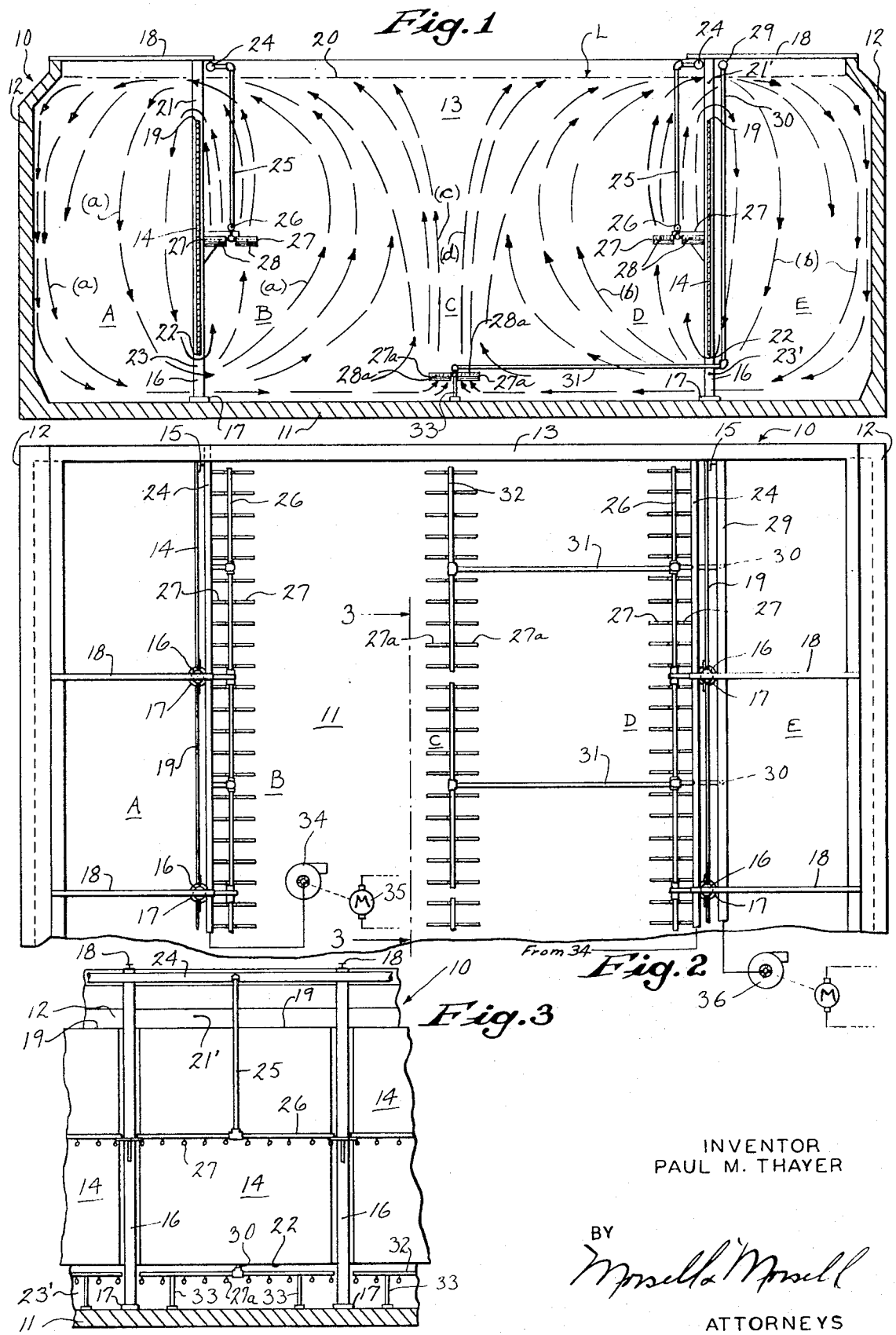

3,615,078
APPARATUS FOR AND METHOD OF AERATING LIQUOR IN LARGE SEWAGE TREATMENT TANKS
Paul M. Thayer, Milwaukee, Wis., assignor to Water Pollution Control Corp., Milwaukee, Wis.
Filed Dec. 3, 1969, Ser. No. 881,709
Int. Cl. B01f 3/04
U.S. Cl. 261—123
10 Claims

ABSTRACT OF THE DISCLOSURE

The aeration tank has oppositely-disposed side walls and has a series of baffles spaced inwardly from each side wall and extending parallel thereto, each baffle terminating a substantial distance short of the liquid level and short of the bottom of the tank. Extending along the inner side of each baffle about midway of the depth of the tank is a row of relatively low pressure air diffusers, and extending along the bottom of the tank midway between the two rows of low pressure diffusers is a row of relatively high pressure diffusers.

BACKGROUND OF THE INVENTION

Field of the invention

The present invention pertains to large size aeration tanks for use in sewage treatment systems for relatively large localities and adapted for carrying out any of the activated sludge processes, including the complete mix process. It is also suitable for use in gas diffusion generally, where similar problems are present.

Description of the prior art

In sewage treatment plants the incoming sewage, together with activated sludge, moves progressively and relatively slowly through the aerating tank. During this time it is usually subjected to aeration and the successful treatment of sewage depends heavily upon the efficient transfer of oxygen into the mixed liquor in the tank. Therefore, diffusers are usually employed to introduce the air in the form of bubbles. Heretofore in large sewage treatment installations it has been customary to use a large number of relatively small aeration tanks of limited depth. It has heretofore been considered impractical to use very large deep tanks because of the problem of obtaining efficient oxygen transfer throughout a large deep tank.

SUMMARY OF THE INVENTION

The present invention provides, in an aeration tank having oppositely-disposed side walls, baffling means spaced inwardly from each side wall and extending approximately parallel thereto with the upper edge of each baffling means terminating a substantial distance short of the liquid level in the tank, and with the lower edge of each baffling means terminating a substantial distance short of the bottom of the tank. Extending along the inner side of each baffling means, about midway of the depth of the tank, is a row of relatively low pressure air diffusers, and extending along the bottom of the tank midway between the two rows of low pressure diffusers is a row of relatively high pressure bottom diffusers. The arrangement is such that each row of low pressure diffusers causes rotary circulation of liquor upwardly along the side of the adjacent baffling means and then over the baffling means by way of the space above its upper edge, and downwardly in the region between the baffling means and the side wall of the tank, and then through the space below the lower edge of the baffling means and upwardly, the row of high pressure bottom diffusers circulating liquor upwardly and toward both side walls of the tank so that the air from this row of diffusers aerates the space intermediate the width of the tank, the circulating liquor ultimately merging with the paths of circulation on both sides of the tank.

A general object of the present invention is to provide a method of aerating mixed liquor in large deep tanks to render the use of tanks of this size and depth practical.

A further object of the invention is to provide a method of aerating mixed liquor in large deep tanks which provides increased oxygen transfer efficiency and complete mixing throughout the entire tank with a minimum of power requirement.

A further object of the invention is to provide an improved method of aerating mixed liquor in large deep tanks which provides for substantially increased time of contact of the air bubbles with the liquid.

A further object of the invention is to provide improved apparatus for effecting commercial exploitation of the improved method.

With the above and other objects in view, the invention consists of the improved apparatus for and method of aerating liquid in large deep tanks, and all of its parts, combinations, and steps, and all equivalents thereof.

BRIEF DESCRIPTION OF THE DRAWING

In the accompanying drawing, illustrating one complete embodiment of the preferred form of the invention:

FIG. 1 is a transverse sectional view through an aeration tank incorporating the improved features of the present invention;

FIG. 2 is a fragmentary plan view of the tank; and

FIG. 3 is a fragmentary sectional view taken approximately on the line 3—3 of FIG. 2.

DESCRIPTION OF THE PREFERRED EMBODIMENT

Referring more particularly to the drawing, the numeral 10 designates a tank which may be formed of any suitable material such as concrete. Inasmuch as the purpose of the present invention is to make it practical to employ large deep tanks, the preferred embodiment illustrates a tank which may be substantially greater than fifteen feet deep, preferably in the neighborhood of thirty feet deep. The width for a tank of thirty foot depth might be approximately seventy-five feet in a typical installation. These dimensions may of course vary with the particular situation. With the present invention any required length of tank may be employed. Thus a single tank may be sized to take the place of a relatively large number of smaller conventionally-sized shallower tanks. The tank has a bottom 11, side walls 12, and end walls 13, only one of which is shown in FIG. 2. The tank is adapted to contain mixed liquor, the level of which is indicated at L.

Spaced inwardly from each side wall is a row of baffles 14. An endmost baffle may be suitably connected to the end wall as at 15 and have its opposite edge suitably connected to an upright column 16. A plurality of the columns 16 are employed which are spaced apart the width of the individual baffles 14, the latter being suitably connected thereto. The lower ends of the columns are supported on the bottom of the tank as at 17, and the upper ends are connected to struts 18 which project inwardly from the upper edges of the side walls 12. The baffles 14 are of such size and so supported that their upper edges 19 are spaced a substantial distance below the liquid level 20, said space being indicated by the numeral 21 on one side and 21' on the other. The lower edges 22 of the baffles are spaced a substantial distance above the bottom of the tank as indicated at 23 on one side and 23' on the other, the spacing distance 23 being approximately equal the spacing distance 21. It is preferred that this spacing be about one-sixth of the depth of the tank.

Extending in parallelism with each series of baffles is a suitably supported air main 24, there being drop pipes 25 extending downwardly from each air main 24 at longitudinally spaced intervals. Preferably there is one drop pipe 25 for each baffle located midway of the length of each baffle 14. The lower end of each drop pipe supports a horizontal air header 26 which is of approximately the length of a baffle, the header 26 being located approximately midway of the depth of the liquid in the tank. Each header 26 preferably supports two rows of air diffusers 27, there being diffusers projecting in both directions from the header, as shown in FIG. 1. While any suitable air diffusers may be employed it is preferred to utilize diffusers of the type shown and described in my Pat. No. 3,424,443, dated Jan. 28, 1969. These diffusers have a horizontal series of air release ports 28 on each side as fully described in said patent, and the air is delivered from the header to the diffusers on the two sides through balancing nozzles as is clearly shown in my prior patent.

Another air main 29 extends longitudinally of the tank above the liquid level and has a plurality of drop pipes 30 extending downwardly therefrom in longitudinally-spaced relationship from each other, each of said drop pipes 30 connecting with a horizontal conduit 31 spaced a short distance above the bottom of the tank and each leading to a header 32. The headers 32 may be supported on short posts 33 projecting upwardly from the bottom of the tank. Each of the headers 32 carries oppositely-projecting rows of diffusers 27a like the diffusers 27 heretofore described, and having rows of air release openings 28a. The rows of diffusers 27a are located near the bottom of the tank and approximately midway in the width of the tank between the two sets of diffusers 27.

An air pump or blower 34 furnishes a relatively large volume of low pressure air to the headers which are located intermediate the depth of the tank. The blower 34 is driven by a suitable motor 35. One blower and motor may furnish air to the mains 24 on both sides, or there-may be a separate blower and motor for each of the mains 24. Another blower 36 furnishes a lower volume of relatively high pressure air to the main 29 which feeds the bottom diffusers 27a. Where the diffusers 27a are twice as deep as the diffusers 27 it is desirable that the blower 36 provide approximately twice the discharge pressure of the blower 34. Both blowers deliver air at high volume to the diffusers. This volume is substantially higher than is customarily employed in the smaller tanks. The volume is varied in accordance with the dimensions of the tank and other requirements, but it must be high enough to create circulation of the liquor substantially throughout the width and depth of the tank in the paths shown by the arrows in FIG. 1.

OPERATION

In operation, the air pump or blowers 34 and 36 are adjusted or sized to deliver a sufficient volume of air under sufficient pressure to the diffusers to meet the particular conditions encountered. The pressure of the air must be equal to the hydrostatic pressure in the tank in the region of the diffusers 27 and 27a, plus an extra increment sufficient to force the air out of the diffuser ports 28 and 28a and must be sufficient to create the desired circulation shown by the arrows in FIG. 1. In view of the fact that the diffusers 27a are located near the bottom of the tank whereas the diffusers 27 are located about halfway down in the depth of the tank, it will normally be necessary to have the discharge pressure for the diffusers 27a approximately twice that of the discharge pressure for the diffusers 27. The air supplied to the set of low pressure diffusers 27 (on the left side, referring to FIG. 1), combined with the action in path (c) of FIG. 1, will result in the upward movement of the liquor at high velocity. This causes a rotary motion of the mixed liquor in path (a) to take place. This rotary motion has the effect of keeping solid material in suspension. The left-hand diffusers will, therefore, cause counterclockwise circulation of the mixed liquor in the circular path in the left-hand region in the width of the tank, as indicated by the arrows (a). The diffusers 27 are of the type described in my prior patent and are capable of releasing air bubbles which are entrained by the circulating liquor and carried in the same path indicated by the arrows (a). Some of the bubbles will of course be released from the surface of the liquid but a large proportion of the bubbles will be entrained by the circulating water to contact the liquid for a relatively long period of time so as to provide efficient oxygen transfer. The spaces 21 and 23 above and below the baffles aid in directing circulation in the desired path. The diffusers 27 on the right-hand side (referring to FIG. 1) together with the action in path (d) act in a similar manner to cause clockwise rotary movement of the liquor in the right-hand region in the width of the tank in the path indicated by the arrows (b). Here there is similar circulation through the spaces 21' and 22' above and below the right-hand series of baffles.

The row of bottom high pressure diffusers 27a causes water circulation as indicated by the arrows to insure circulation midway of the width of the tank in zone C which is not taken care of by the side diffusers. This circulating water in zone C ultimately intermingles with the liquor being circulated in zones A and B and in zones D and E as illustrated. In addition the bottom diffusers cause circulation of liquor along the bottom of the tank in both directions toward the diffusers 27a as shown by the arrows in FIG. 1. By maintaining the bubbles at relatively high velocity they stay under water longer. The velocity of the air through the diffusers 27 and 27a will be that which is necessary to meet the particular conditions. This requires a high enough velocity to keep the water circulation substantially throughout the width and depth of the tank at such a rate that the maximum percentage of air bubbles are entrained and kept under water for a maximum length of time.

Rotation of the liquor in a counterclockwise direction in zones A and B is insured because the circulating liquor from the bottom rows of diffusers 27a tends to fan out in the opposing paths c and d, path c being in a counterclockwise direction and tending to merge with the circulation from the diffusers 27 in zones A and B, which is in a counterclockwise direction. The circulation into zone A is also insured due to the fact that as the diffusers in zone B cause upward movement of liquor this causes liquor to move from zone A through the spaces 23 beneath the baffles up into zone B. Thus it is the combination of the arrangement of the high pressure diffusers and the spacing above and below the baffles at 21 and 23 which assure circulation in the direction indicated. Similarly, circulation through zones D and E in a clockwise direction is insured due to the fact that the circulation indicated by the arrows (d) tends to move in a clockwise direction toward the spaces 21' and through to zone E, thereby insuring that the circulation from the diffusers 27 in zone B also moves in this same direction. Circulation through zone E is also insured because of the space 22' below the baffles through which liquor moves when liquor is being circulated upwardly by the action of the diffusers 27 in zone B. The spaces 21 and 22 and 21' and 22' must be large enough not to materially increase the velocity of the currents flowing therethrough, and must be large enough to allow the majority of the entrained bubbles of air to pass through without being dissipated at the surface of the liquid.

With the present invention it is apparent that an efficient method of causing oxygen transfer through large deep tanks has been provided, which insures circulation and transfer at the bottom of the tank as well as in all other portions thereof. For maximum efficiency it is preferred to have the distance between a side wall 12 and the adjacent baffle 14 (zones A and E) equal to approximately one-fifth of the width of the tank, with the central chamber (zones B, C and D) which is between the two series of baffles equal to approximately three-fifths of the width of the tank. Thus the width of the tank is in effect divided into five zones of about equal sizes: zone A being between the left side wall and the adjacent series of baffles 14; zone B being a zone of about equal width to A extending on the right of the baffles 14; zone C being a zone of about equal width located over the high pressure bottom diffusers; zone D being a zone approximately equal in width to zone B; and zone E being a zone between the other set of baffles 14 and the other side wall 12.

It is to be understood that I do not desire to be limited to the exact details of construction shown and described, for obvious modifications will occur to a person skilled in the art.

What I claim is:

1. A method of aerating mixed liquor in an elongated sewage treatment tank having spaced side walls comprising the steps of diffusing air into the tank along a central path which extends longitudinally of the tank near its bottom and intermediate the width thereof, diffusing air into the tank along a first side path which extends longitudinally of the tank and which is substantially higher than said central path and which is positioned between the central path and one side wall, baffling the circulation of liquor in a location between said first side path and said one side wall of the tank while permitting flow of liquor across the top of the tank and toward said one side wall and then in a reverse direction across the bottom of the tank away from one side wall to provide a region of counterclockwise circulation of liquor toward and away from said one side wall, and diffusing air into the tank along a second side wall path which extends longitudinally of the tank also at a substantially higher elevation than the central path and which is positioned between said central path and the other side wall of the tank, and circulation of liquor in a location between said second side wall path and said other side wall permitting flow of liquor across the top of the tank toward said other side wall and then in a reverse direction across the bottom of the tank, and baffling the circulation of liquor in a location between said second side wall path and said other side wall while permitting flow of liquor across the top of the tank toward said other side wall and then in a reverse direction across the bottom of the tank away from said other side wall, and discharging the diffusion air with sufficient pressure to create said circulation substantially throughout the width and depth of the tank.

2. A method of aerating mixed liquor as claimed in claim 1 in which the diffusion along the central path takes place midway of the width of the tank.

3. A method of aerating mixed liquor as claimed in claim 1 in which the baffling is performed close to the first and second side paths.

4. A method of aerating mixed liquor as claimed in claim 1 in which the diffusion along said central path is caused to circulate liquor upwardly and toward both said clockwise and counterclockwise regions to merge therewith.

5. A method of aerating mixed liquor as claimed in claim 1 in which the diffusion along the side paths is approximately midway of the depth of the tank.

6. A method of aerating mixed liquor as claimed in claim 1 in which the air which is diffused along the central path is at a substantially higher discharge pressure than along the two side paths.

7. In an elongated liquid treatment tank having oppositely-disposed side walls, a line of gas diffusers adjacent the bottom of the tank extending longitudinally thereof intermediate the width of the tank, a line of gas diffusers extending longitudinally of the tank and intermediate the depth thereof at a higher elevation than said bottom diffusers and located between said bottom diffusers and a first side wall of the tank and spaced inwardly from said first side wall, baffling means between said last diffusers and said first side wall, a line of gas diffusers extending longitudinally of the tank and intermediate the depth thereof and also at a higher elevation than said bottom diffusers and located between said bottom diffusers and the second side wall of the tank and spaced inwardly from said second side wall, baffling means between said last line of diffusers and the second side wall, both baffling means terminating a substantial distance below the liquid level in the tank to provide top circulating spaces above the baffling means and also terminating a substantial distance above the bottom of the tank to provide bottom circulating spaces, and means for supplying gas under pressure to said gas diffusers whereby rotary circulation of liquid with entrained bubbles is established substantially throughout the width and depth of the tank in opposing directions toward the two sides.

8. An elongated liquid treatment tank as claimed in claim 7 in which the lines of diffusers which are intermediate the depth of the tank are approximately midway of said depth.

9. An elongated liquid treatment tank as claimed in claim 7 in which the line of diffusers which is intermediate the width is midway of said width, and in which each baffling means is located approximately one-fifth of the width of the tank inwardly from the adjacent side wall.

10. An elongated liquid treatment tank as claimed in claim 7 in which each baffling means is close to the adjacent line of diffusers.

References Cited

UNITED STATES PATENTS

| | | | |
|---|---|---|---|
| 3,043,433 | 7/1962 | Singer | 210—197 |
| 3,133,130 | 5/1964 | Lambeth | 261—123 |
| 3,236,767 | 2/1966 | Ross et al. | 210—200 X |
| 3,355,023 | 11/1967 | Foster | 261—123 X |
| 3,424,443 | 1/1969 | Thayer | 261—124 X |

FOREIGN PATENTS

| | | | |
|---|---|---|---|
| 349,552 | 11/1960 | Switzerland | 210—220 |

TIM R. MILES, Primary Examiner

U.S. Cl. X.R.

210—220